United States Patent
Balasinski (12) 
(10) Patent No.: US 7,231,374 B1
(45) Date of Patent: Jun. 12, 2007

(54) SCHEME FOR EVALUATING COSTS AND/OR BENEFITS OF MANUFACTURING TECHNOLOGIES

(75) Inventor: Artur P. Balasinski, Cupertino, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/571,826

(22) Filed: May 16, 2000

(51) Int. Cl.
*G06F 17/14* (2006.01)
(52) U.S. Cl. ...................................................... 705/400
(58) Field of Classification Search ................ 705/1, 705/7, 8, 400; 700/36, 95, 96, 97
See application file for complete search history.

(56) References Cited

U.S. PATENT DOCUMENTS

| | | | | |
|---|---|---|---|---|
| 5,572,082 A | * | 11/1996 | Sokol | 310/366 |
| 6,032,123 A | | 2/2000 | Jameson | 705/400 |
| 6,247,366 B1 | * | 6/2001 | Porter | 73/571 |
| 6,311,149 B1 | * | 10/2001 | Ryan et al. | 703/21 |

FOREIGN PATENT DOCUMENTS

JP 08-205260 * 8/1996

WO WO 01/09542 A2 * 2/2001

OTHER PUBLICATIONS

Unknown Author, "Interactive Integrated Circuit Design and Test System", Oct. 1986, IBM Technical Disclosure Bulletin, Vo 29, Issue 5, pp. 2002-2203.*
Unknown Author, "Engineering Functional Areas", Aug. 1999, available at http://ecs.engr.wisc.edu/student/samples/funcareas.pdf.*

* cited by examiner

*Primary Examiner*—Thomas A. Dixon
(74) *Attorney, Agent, or Firm*—Kevin L. Daffer; Mollie E. Lettang; Daffer McDaniel, LLP (57) ABSTRACT

An embodiment of a method of evaluating costs and/or benefits of possible configurations of a manufactured product (e.g., an integrated circuit, an electronic system, etc.) includes establishing an upgrade cost and a redesign cost for each characteristic within a set of characteristics associated with the product configuration. The upgrade cost is the cost to upgrade the characteristic in a manner commensurate with other upgraded characteristics, while the redesign cost is the cost to redesign the product to accommodate the characteristic if it is not upgraded commensurately. A predicted total cost and a predicted benefit for a configuration may also be computed. In addition, the total cost for the corresponding configuration may be subtracted from such a benefit to determine a net benefit for the configuration. The method may be implemented using a computer-based system including upgrade cost data and redesign cost data.

29 Claims, 8 Drawing Sheets

| Configuration # | Characteristics upgraded | Characteristics not upgraded | Characs. partially upgraded | Config. upgrade cost ($M) | Config. redesign cost ($M) | Config. partial cost ($M) | Config. total cost ($M) |
|---|---|---|---|---|---|---|---|
| 1 | A | B, C, D | | 10 | 36 | | 46 |
| 2 | B | A, C, D | | 5 | 31 | | 36 |
| 3 | C | A, B, D | | 15 | 29 | | 44 |
| 4 | D | A, B, C | | 7 | 27 | | 34 |
| 5 | A, B | C, D | | 15 | 26 | | 41 |
| 6 | A, C | B, D | | 25 | 24 | | 49 |
| 7 | A, D | B, C | | 17 | 22 | | 39 |
| 8 | B, C | A, D | | 20 | 19 | | 39 |
| 9 | B, D | A, C | | 12 | 17 | | 29 |
| 10 | C, D | A, B | | 22 | 15 | | 37 |
| 11 | A, B, C | D | | 30 | 14 | | 44 |
| 12 | A, B, D | C | | 22 | 12 | | 34 |
| 13 | B, C, D | A | | 27 | 5 | | 32 |
| 14 | A, B, C, D | | | 37 | | | 37 |
| 15 | B, C, D | | A | 27 | | 9 | 36 |
| 16 | B, D | | A, C | 12 | | 25 | 37 |

SCHEME FOR EVALUATING COSTS AND/OR BENEFITS OF MANUFACTURING TECHNOLOGIES

BACKGROUND OF THE INVENTION

1. Field of the Invention

This invention relates to cost/benefit analysis in manufacturing, and more particularly to a method and system for evaluating costs and/or benefits of various possible configurations of a manufactured product.

2. Description of the Related Art

The following descriptions and examples are not admitted to be prior art by virtue of their inclusion within this section.

Manufacturing of products typically involves repeated upgrading of a product over time. One reason for such upgrading can be consumer demand for improved products as better technology becomes available. For example, the operating speeds available for personal computers have increased more than tenfold in the decade from 1990 to 2000. Upgrading of a product can also make the product less expensive to produce in some cases, leading to higher profits. In integrated circuit manufacturing, for example, upgrading often involves producing circuits having smaller geometries, such that more of the circuits fit on a single semiconductor wafer. If any additional cost of manufacturing a wafer with such smaller-geometry circuits is smaller than the increased income realized from producing more circuits per wafer, the upgraded circuits are less expensive to produce. Of course, many different motivations may be involved in a decision to upgrade a manufactured product. For example, an upgrade to smaller-geometry circuits as described above may also provide other advantages which may lead to increased income, such as increased circuit speed, reduced weight or power consumption, or suitability for a new application or market.

In the case of a relatively complex manufactured product, many different configurations of the product are possible. A computer, for example, typically includes multiple components or modules, such as processor, memory, and peripheral driver chips. There are generally multiple available variations for each of these components or modules, and therefore many unique combinations, or configurations, of the computer are possible. An integrated circuit may contain millions of interconnected transistors, formed using multiple masking layers. The masks used in the circuit's fabrication are generated using an arrangement of the transistors (and other circuit components) known as a layout. Some of the constraints used to arrive at the layout are embodied in a set of rules called design rules, which may take various forms. A design rule could be a dimension of a particular feature, such a gate width, or a relationship between features, such as an "enclosure", or amount of overlap between a metal in a contact region and an underlying conductive via. Furthermore, a design rule could be a non-numerical rule, such as a requirement that an interconnect line in one layer not intersect with one in a different layer. A set of design rules is used when drawing a layout, or possible configuration, of the integrated circuit. Because an integrated circuit layout can easily be subject to more than 50 design rules, multiple different configurations are possible.

This multitude of possible configurations can make it difficult to determine the most cost-effective configuration for an upgraded product. Decisions as to upgraded product configurations are often made in an ad hoc manner, without a consistent approach to comparison of possible configurations. It would therefore be desirable to develop a method and system for consistent evaluation of possible upgraded product configurations. The desired method should provide information on the cost-effectiveness of proposed product upgrade configurations, as compared either to other configurations or to a non-upgraded product.

SUMMARY OF THE INVENTION

The problems outlined above are in large part addressed by a method and system for evaluating costs and/or benefits of possible configurations of a manufactured product. Each configuration is associated with a set of characteristics of the product. In particular, a configuration generally includes a status of each of the characteristics in the set, where the status indicates whether the characteristic is upgraded or not within the configuration. In the integrated circuit manufacturing discussed above, for example, a characteristic may correspond to a design rule used to generate the circuit layout, and a configuration corresponding to the layout may include a combination of upgraded and non-upgraded design rules. In an embodiment, the method includes establishing an upgrade cost and a redesign cost for each of the characteristics in the set. The upgrade cost is the cost to upgrade the characteristic in a manner commensurate with other upgraded characteristics, while the redesign cost is the cost to redesign the product to accommodate the characteristic if it is not upgraded commensurately. A predicted total cost for a given configuration may be computed, where the total cost includes the sum over each of the characteristics of the corresponding upgrade cost or redesign cost, depending on whether the characteristic is upgraded or not in the configuration. The total costs for each of multiple configurations may be compared to determine a lowest-cost configuration. A predicted benefit for a configuration may also be computed, where the benefit includes a predicted increase in income associated with manufacture of the configuration. The total cost for the corresponding configuration may be subtracted from such a benefit to determine a net benefit for the configuration, and the net benefits may be compared for various configurations to determine a highest-net-benefit configuration.

A rationale for the method described herein includes recognition of an important tradeoff often encountered in product upgrades: the cost of upgrading a characteristic of a product versus the cost of redesigning the product to accommodate a characteristic which is not upgraded along with other characteristics. Product design typically involves establishing a particular relationship between the various characteristics of the product. In some cases, a product may be upgradeable without changing this relationship. For example, it may be possible to fabricate a "next generation" of an integrated circuit by using the same layout, but applying a scaling factor during generation of the masks used to form the circuit, such that the lateral circuit features defined by the masks are uniformly smaller than for the previous generation of the circuit. This uniform scaling (by as large a factor as possible) is a desired solution, because if it can be done, then no redesign is needed, where "redesign" in this case refers to redesign of the layout.

Fabrication of a properly operating circuit using such a uniform scaling of all masks may be problematic, however. For example, new processing equipment is typically needed to achieve some of the smaller feature geometries. Physical properties of the materials used in fabricating the circuit may prevent some of the vertical dimension reduction needed to allow successful manufacture and operation of the circuit with reduced lateral dimensions. There may therefore be reasons to not scale the entire layout uniformly, but to leave some design rules unscaled, or at least scaled by a different factor. Scaling of some rules and not others, however, necessitates a redesign of the layout, since this changes the original relationship between the rules such that one or more masks will have to be changed. The redesign process must ensure that any changes to the layout are "legal", or consistent with all applicable design rules. There is therefore a tradeoff between the cost of upgrading (in this case, scaling the size of) a design rule and redesigning the layout to accommodate not upgrading the rule (not scaling the rule, or not scaling it commensurately). Although the general tradeoff between the cost of scaling and the cost of redesign in integrated circuit manufacturing has been recognized, these costs are not believed to have been quantified in a consistent manner on a rule-by-rule basis. Decisions as to which design rules are scaled and when a redesign is needed are instead often made through an interplay between, for example, a layout group and a fabrication group, in a process which may not include a comprehensive assessment of alternatives.

The above-described tradeoff between upgrade cost and redesign cost may occur in manufacture of products other than integrated circuits. For example, upgrade of a product could involve a scaling of the operating speed of a computer or other electronic system. Operating software of such a system is typically configured to provide the proper sequencing and timing relationships between the components of the system (e.g., circuits, subcircuits and/or modules). If the operating speed (e.g., clock speed, memory access speed, etc.) of all of these components can be scaled up by the same factor, the system may be able to be upgraded with no redesign of the operating software. If the speed of some components cannot be increased commensurately, however, then redesign of the software may be needed to accommodate the differences in speed between the components. The method and system described herein are considered applicable to any manufacturing situation involving a tradeoff between costs of upgrading a characteristic of the product commensurately with other characteristics and costs of redesigning some aspect of the product to accommodate a non-upgraded characteristic.

This method and system are believed to be advantageous in providing a consistent scheme for evaluation of costs and/or benefits of possible configurations of manufactured products. Such an evaluation may be useful in making decisions as to whether and in what way to upgrade a product. The method may also be useful in situations for which a manufacturing problem necessitates a redesign of a product, in helping to determine an optimum configuration for the redesigned product. Even in cases for which more than one configuration of a product is manufactured, it may be useful to determine the most cost-effective configurations. The use of a consistent scheme may be particularly helpful in allowing examination of the effect of variations in quantities input to the scheme. Some of the quantities upon which estimation of, e.g., upgrade costs or redesign costs are based may not be known with certainty in advance. For example, uncertainty may be associated with future labor costs, time needed to implement a process, or the yield obtainable from a process. The method and system described herein may allow the effect of such uncertainty on costs and/or benefits to be quantified, by such methods as computing costs or benefits using both high and low estimates of a quantity, or by assigning ranges to input quantities which are carried through to the cost and/or benefit results using error analysis techniques.

In an embodiment of the method for use in integrated circuit manufacturing, the product may be an integrated circuit, and a possible configuration of the product can be represented by a corresponding integrated circuit layout. The above-described set of characteristics of the product may correspond to a set of scalable design rules within the layout (it is assumed in this embodiment that non-numerical design rules are not subject to scaling and are not associated with upgrade and redesign costs). Each layout is subject to the set of design rules, in some combination of upgraded rules and non-upgraded rules. Each such combination of upgraded and non-upgraded rules therefore corresponds to a possible configuration of the integrated circuit. Upgrading of a characteristic corresponds to scaling the size of the design rule by the same factor that the sizes of other rules in the set of design rules are scaled by. The upgrade cost may include various costs associated with scaling the design rule, such as a cost for any new equipment needed to scale the rule (i.e., fabricate the circuit embodying the scaled rule), a cost for time needed to implement the scaling, and any increased operational costs associated with the manufacturing process needed to scale the rule. The upgrade cost for a design rule may depend upon which of the other design rules in the set are also being upgraded in a given configuration. The redesign cost for the characteristic includes the cost of redesigning the layout to accommodate non-commensurate scaling of the design rule. This cost may include various costs associated with the redesign, such as costs for labor, time to implement the redesign, and any increase in die size which may result from the non-commensurate scaling of the design rule.

In an embodiment of the method for use in manufacture of electronic systems, the set of characteristics may correspond to a set of circuits within an electronic system. Each possible configuration of the electronic system corresponds to some combination of upgraded and non-upgraded circuits in the set of circuits. Upgrading of a characteristic corresponds to scaling the operating speed of the corresponding circuit by the same factor that operating speeds of other circuits in the set of circuits are scaled by. The upgrade cost may include various costs associated with increasing the speed of the circuit, such as an increase in component costs or costs for improved power supplies or heat sinks. The redesign cost for a characteristic may include the cost of redesigning the operating software of the system to accommodate non-commensurate scaling of the speed of a circuit. This cost may include various costs associated with such a redesign, such as costs for labor and for time to implement the redesign.

In some embodiments of the method, a partial upgrade cost and a partial redesign cost may also be established for a characteristic. The partial upgrade cost may represent the cost to upgrade the characteristic in a manner incommensurate with others of the characteristics. For example, a design rule of an integrated circuit layout may be shrunk by a factor smaller than that which other design rules are shrunk by. The partial redesign cost may similarly represent the cost to redesign the layout to account for a partial upgrade of a characteristic. In the case of such a partial upgrade of a characteristic, both the partial upgrade cost and the partial redesign cost are typically included in computing the total cost for a configuration containing the partially upgraded characteristic, since both of these costs would be incurred in manufacturing the product containing the characteristic.

In addition to the method discussed above, a system for evaluating possible configurations of a manufactured product is contemplated herein. The system includes a processor operably coupled to a storage medium, where the storage medium includes upgrade cost data and redesign cost data for each of a set of characteristics of the product. In some embodiments of the system, other data may be included on the storage medium, such as configuration data describing which characteristics are upgraded in each of a set of possible configurations of the product. Benefit data characterizing an increase in income associated with manufacture of the product may also be included on the storage medium, as may program instructions executable for computing a total cost and/or a net benefit associated with each configuration.

In addition to the method and system described above, a computer-usable medium is contemplated herein. The medium may be a storage medium, such as a magnetic or optical disk, a magnetic tape, or a memory. In addition, the medium may be a transmission medium, such as a wire, cable, or wireless medium along which data or instructions are transmitted, or a signal carrying the data or program instructions along such a wire, cable or wireless medium. The medium may contain instructions executable for carrying out embodiments of the method described herein and/or data associated with the method.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1A:
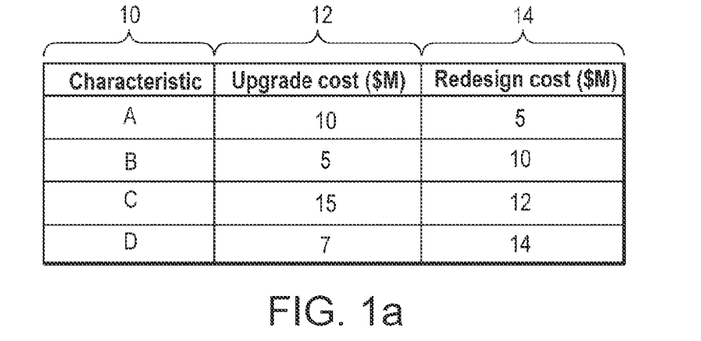
FIG. 1 illustrates exemplary embodiments of upgrade cost data and redesign cost data for a set of characteristics of a product.

Exemplary embodiments of upgrade cost data and redesign cost data for a set of characteristics of a manufactured product are shown in FIG. 1. In the embodiment of FIG. 1(a), each of product characteristics 10 (labeled A, B, C and D) has a corresponding upgrade cost 12 and redesign cost 14. Characteristics 10 may represent any characteristics of a product which are subject to upgrade. For example, characteristics 10 may be numerical design rules for an integrated circuit layout, where the design rules are subject to scaling in size. As another example, characteristics 10 could represent components or subcircuits of an electronic system, where the components are subject to scaling in operating speed. Characteristic A has an upgrade cost of $10 million in this embodiment, and a redesign cost of $5 million. Upgrade and redesign costs are similarly defined for each of the other characteristics in the set. The set of characteristics typically includes all characteristics subject to the contemplated upgrade (e.g. size or speed scaling), while excluding those characteristics for which the upgrade is not applicable.

In the embodiment of FIG. 1(a), a single upgrade cost and redesign cost are defined for each characteristic. In another embodiment, shown in FIG. 1(b), the upgrade cost for a characteristic is dependent upon which other characteristics are also upgraded in a given configuration. In addition to characteristics 10, other upgraded characteristics 16 are included in the data of FIG. 1(b). Each of upgrade costs 12 corresponds to the upgrade cost allocated to the corresponding characteristic 10 when characteristic 16 in the same row is also upgraded (for the purposes of this example, it is assumed that no characteristics are upgraded except for those in columns 10 and 16 of a given row). For example, if characteristics A and B are both upgraded, the upgrade cost for characteristic A is $10 million (no information as to the upgrade cost for characteristic B is given in this example). If characteristics A and C are both upgraded, however, the upgrade cost allocated to characteristic A is $5 million. In other words, the upgrade cost allocated to characteristic A is reduced for configurations in which characteristic C is upgraded as well. It can be seen from the data of FIG. 1(b) that the upgrade cost for characteristic C is also reduced when both C and A are upgraded, to $10 million as compared to $15 million when C is upgraded along with characteristic B or D. As an example of a situation in IC manufacturing which could give rise to the data of FIG. 1(b), characteristics A and C could be design rules which both require the same $10 million equipment-related expenditure if scaling by a particular factor is to be implemented. The upgrade cost of design rule A alone may be determined entirely by this expenditure, while that of rule C alone may also includes other costs to total $15 million. If rules A and C are both upgraded in a given configuration (layout) of the circuit, however, the shared $10 million cost may be split between them so that it is not counted twice when adding costs for each characteristic to determine a total cost for the configuration. Such sharing of an upgrade cost between characteristics may also arise in other types of product manufacturing. For example, in an embodiment for which characteristics A and C of FIG. 1(b) are subcircuits in an electronic system, the shared $10 million cost could be related to improved power supply and heat sink requirements involved with increasing the speed of the subcircuits.

Figure 1B:
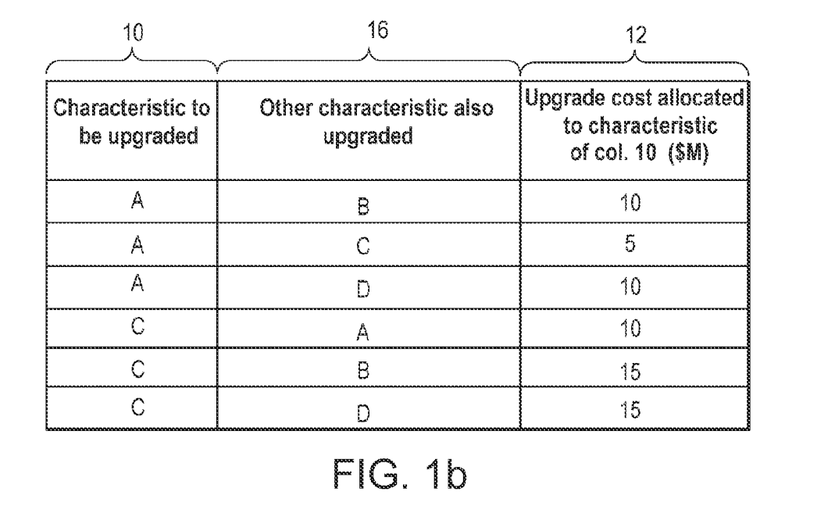

In a manner similar to that for upgrade costs 12 of FIG. 1(b), redesign cost for a characteristic may exhibit a dependence upon which other characteristics in a configuration are also necessitating redesign. Depending upon the amount of interdependence between the upgrade and redesign costs of characteristics within a configuration, configuration-dependent costs for each characteristic may be established as in FIG. 1(b), or configuration-independent costs as in FIG. 1(a) may be used instead. In embodiments for which just one upgrade cost and one redesign cost are established for each characteristic, the cost may be adjusted (typically reduced) to reflect the likelihood of being shared with another characteristic and the amount of any such sharing.

Figure 1C:
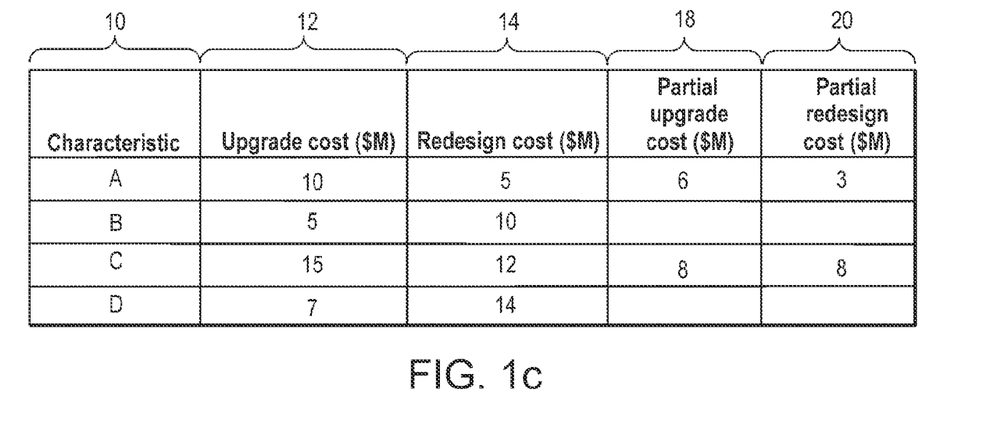

Another example of upgrade and redesign cost data is shown in FIG. 1(c). In addition to being associated with upgrade costs 12 and redesign costs 14, as also shown in FIG. 1(a), characteristics A and C each also have a partial upgrade cost 18 and a partial redesign cost 20. Partial upgrade cost 18 represents the cost to upgrade the corresponding characteristic to a lesser degree than that of other upgraded characteristics. Such a partial upgrade could be a scaling in size of an integrated circuit design rule, but by a less stringent scale factor than that by which other design rules are scaled. Because the rule is not scaled commensurately with the other rules, the same layout cannot be used, and some redesign will be required. For some characteristics of a product, a partial upgrade may allow a reduced partial upgrade cost as compared to a full upgrade cost, and a reduced partial redesign cost as compared to the redesign cost when the characteristic is not upgraded at all. In the case of a partial upgrade, both the partial upgrade cost 18 and partial redesign cost 20 are generally included in the cost associated with the characteristic, since both the partial upgrade and the partial redesign take place together. This is in contrast to the case of a complete upgrade, in which either the upgrade cost 12 or the redesign cost 14 is attributed to the characteristic, depending upon whether the characteristic is upgraded or not.

The sets of data shown in FIG. 1 are merely exemplary embodiments, and many other embodiments are possible and contemplated. Data similar to that of FIG. 1 may be stored in various types of data structure, such as a database, lookup table, or a data structure associated with a spreadsheet program. The data could also be arranged and stored using an object-oriented data structure having, e.g., an object associated with each characteristic, and the various costs for the characteristic being attributes of each object. Data shown in a single table in FIG. 1 could be separated into multiple data structures, or data shown in multiple tables could be combined into a single data structure. The data may be created in various ways, such as entry by a user or writing by a program used to compute upgrade costs and/or redesign costs. In embodiments of the methods described herein, more or fewer characteristics could be included in data such as that of FIG. 1 (typically more). A set of data could also include upgrade and redesign costs associated with more than one possible upgrade (e.g., more than one size scaling factor, or more than one speed scaling factor).

Figure 2:
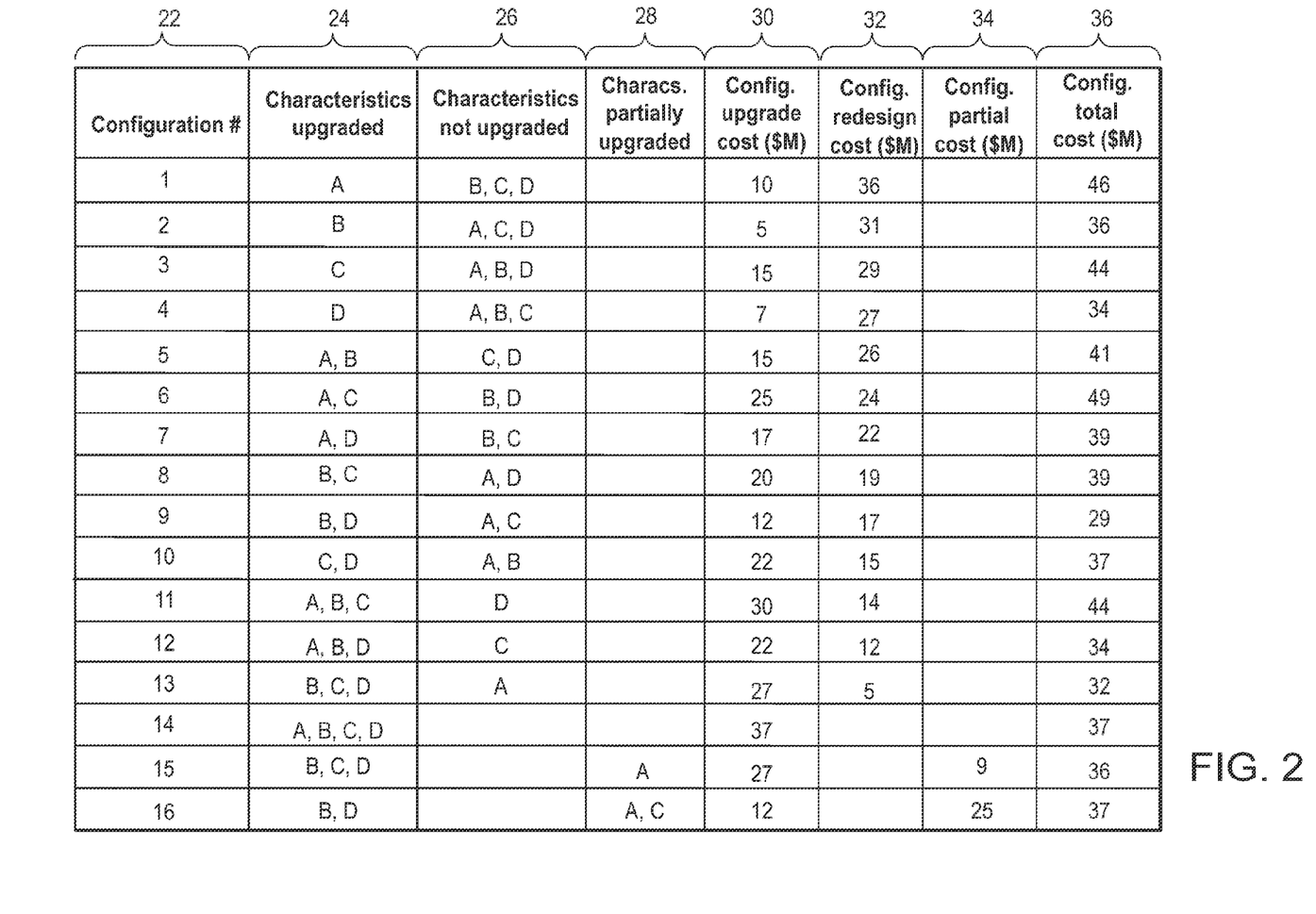
FIG. 2 illustrates exemplary configurations of a product including the characteristics of FIG. 1, and corresponding total costs of each configuration.

Exemplary configurations associated with the characteristics of FIGS. 1(a) and 1(c) are illustrated by the data of FIG. 2. Each of configurations 22, numbered 1 through 16, includes a different combination of upgraded characteristics 24, non-upgraded characteristics 26 and/or partially upgraded characteristics 28. The data of FIG. 2 also includes a configuration upgrade cost 30 for each configuration, as well as a configuration redesign cost 32, a configuration partial upgrade cost 34, and a total cost 36. Configuration upgrade cost 30 is the sum of the upgrade costs of upgraded characteristics 24, where the upgrade costs correspond to upgrade costs 12 of FIG. 1(a). For configuration no. 9, for example, configuration upgrade cost 30 is $12 million, obtained by adding upgrade costs of $5 million and $7 million from FIG. 1(a) for upgraded characteristics B and D. Configuration redesign cost 32 is the sum of the redesign costs of non-upgraded characteristics 26, where the redesign costs correspond to redesign costs 14 of FIG. 1(a). Configuration partial upgrade cost 34 is the sum of the partial upgrade costs and partial redesign costs of any partially upgraded characteristics 28, where the partial upgrade costs and partial redesign costs correspond to costs 18 and 20 of FIG. 1(c). In the case of configuration no. 15, for example, configuration partial upgrade cost 32 is $9 million, obtained by adding the partial upgrade cost and partial redesign cost shown in FIG. 1(c) for partially upgraded characteristic A. In the embodiment of FIG. 2, configuration upgrade cost 30, configuration redesign cost 32 and configuration partial upgrade cost 34 are added together for each configuration 22 to obtain a total cost 36 for the configuration.

Figure 3:
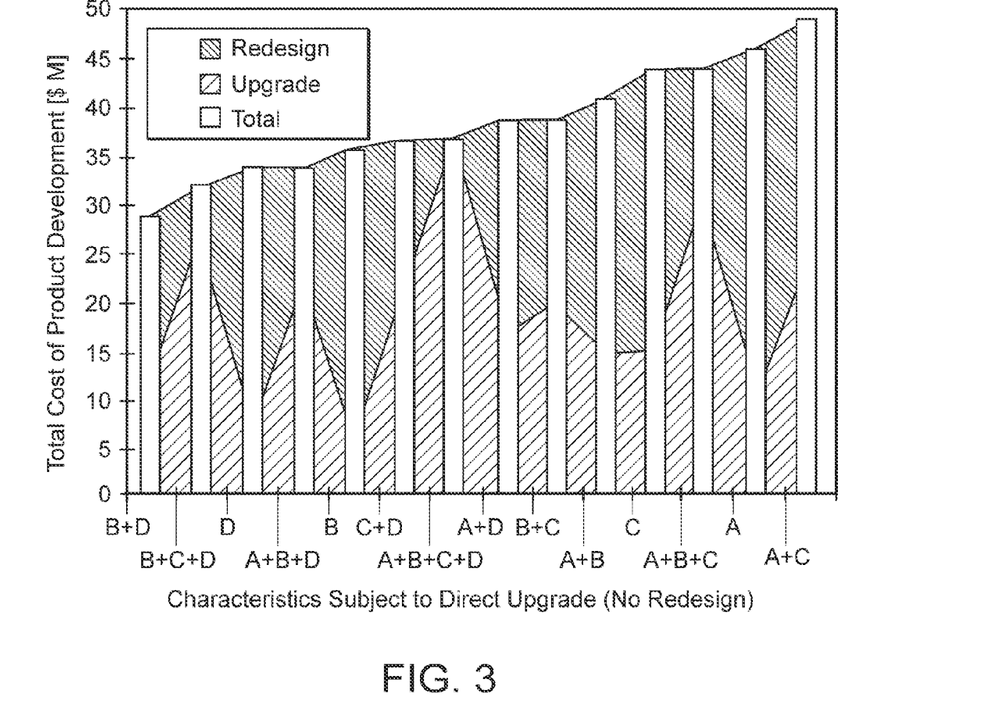
FIG. 3 is a plot of upgrade, redesign, and total cost for some of the configurations of FIG. 2.

A lowest-cost configuration corresponding to the example of FIG. 2 may be found by examination of total costs 36. In this case, the lowest cost configuration is configuration no. 9, having a cost of $29 million. A comparison of costs for the configurations numbered 1 through 14 is also shown in FIG. 3. In the plot of FIG. 3, the first 14 configurations of FIG. 2 are sorted in order of increasing total cost. The cross-hatched regions on the plot illustrate the interplay between upgrade cost and redesign cost in determining the total cost of the various configurations.

The data shown in FIG. 2, and any other data described herein, may be arranged and stored in various data structures, such as those discussed above in the description of FIG. 1. In an object-oriented approach, for example, configurations 22 could be represented as objects, with the characteristics and their status (upgraded, not upgraded, etc.) being attributes of the objects. Each configuration could also be represented as a class of objects, where objects correspond to, e.g., characteristics within the configuration. In some embodiments, configuration-dependent cost data such as that of FIG. 1(b) could be used in determining costs 30, 32, and/or 34. Not every possible combination of characteristics A, B, C and D is shown in FIG. 2. In some embodiments, every possible configuration may be evaluated, while in other cases a user may select the configurations of interest.

Figure 4:
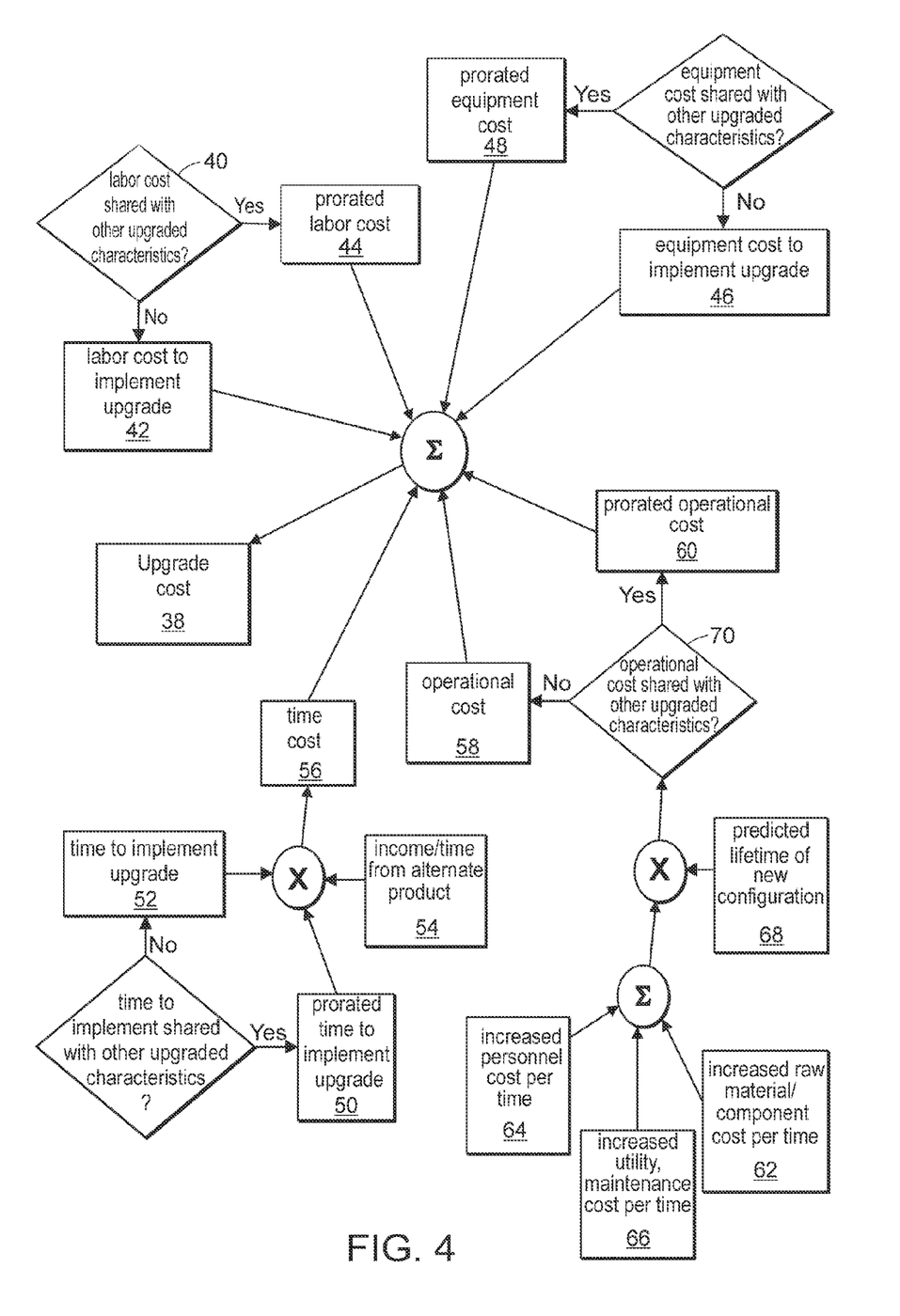
FIG. 4 illustrates an exemplary procedure for establishing an upgrade cost for a characteristic.

Turning now to FIG. 4, an exemplary procedure for establishing an upgrade cost for a characteristic of a product is shown. In the embodiment of FIG. 4, upgrade cost 38 includes a sum of a labor cost, an equipment cost, a time cost, and an operational cost. Many of these costs may be configuration-dependent, based on which other characteristics are upgraded in the configuration, as discussed above in the description of FIG. 1(b). For example, in the case for which the labor cost associated with upgrading a characteristic is properly shared with other characteristics being upgraded in the configuration (decision box 40), a prorated (between the appropriate other characteristics) labor cost 44 is included in upgrade cost 38. If the labor cost associated with upgrading of the characteristic is not shared with other upgraded characteristics, on the other hand, total labor cost 42 associated with the upgrade is used. Similarly, either prorated equipment cost 48 or total equipment cost 46 is included in upgrade cost 38. The time needed to implement the upgrade of the characteristic, either total time 52 or prorated time 50 as appropriate, is multiplied by the income per time 54 which could alternatively be realized with the resources used to implement the upgrade, to determine time cost 56. In the case of integrated circuit fabrication, for example, income per time 54 may represent the income which would be generated by alternatively using the fabrication line to produce the previous configuration of the product during the time that the line is being used to develop the process to fabricate the new configuration. The previous configuration of the product could presumably be produced without time lost to equipment installation, process qualification, etc. Time cost 56 therefore represents income lost during the time needed to implement the upgrade.

The embodiment of FIG. 4 also includes either operational cost 58 or prorated operational cost 60, depending upon whether the increased operation cost associated with upgrade of the characteristic is shared with other upgraded characteristics. In this embodiment, an increase in raw material and/or component cost 62 per unit time is combined with an increase in personnel cost 64 per unit time and an increase in utility and/or maintenance cost 66 per unit time. The total is multiplied by the predicted lifetime 68 of the new configuration. These increases in cost are preferably in comparison to the previously-manufactured (non-upgraded) configuration. In some embodiments, however, the upgrade cost may be calculated as an absolute cost rather than with reference to the non-upgraded configuration. This possibility is discussed further below in the description of FIG. 6. In the embodiment of FIG. 4, decision 70 as to whether the operational cost is shared with other characteristics is made after summing cost components 62, 64 and 66. Such prorating could also be done for the individual components, however, before the summing.

The procedure of FIG. 4 is merely an exemplary embodiment, and other procedures are possible and contemplated. For example, the upgrade cost could have more or fewer component costs in some embodiments, or the cost could be broken down into different component costs. The relative importance of the component costs of FIG. 4 typically depends on the product being manufactured. Equipment cost, for example, is generally a very important factor in upgrading an integrated circuit. Decreasing the size of a design rule such as gate length or contact width may require a new photolithographic mask aligner, for example. In another product upgrade example, such as upgrading the operating speed of an electronic system, equipment involved in an upgrade might include, for example, a pick-and-place machine used in assembling circuit boards. If a speed upgrade necessitated shorter board interconnects and more precise integrated circuit placement, a new machine might be needed. A more important cost component for such a speed upgrade, however, might be increased component and subcircuit costs. In the embodiment of FIG. 4, such costs could be included in raw material and/or component cost 62. Although upgrade cost 38 of FIG. 4 is configuration-dependent, through decision boxes such as 40 and 70, a single upgrade cost to be used for all configurations could also be determined. For example, instead of summing either a total cost or a prorated cost depending upon whether the cost is shared with other characteristics in a configuration, the total cost and prorated cost could be combined to form a single cost (e.g., labor cost, equipment cost, etc.). This combination could take into account the likelihood of the cost being shared with other characteristics, possibly taking the form of a weighted average of the total cost and applicable prorated costs.

Figure 5:
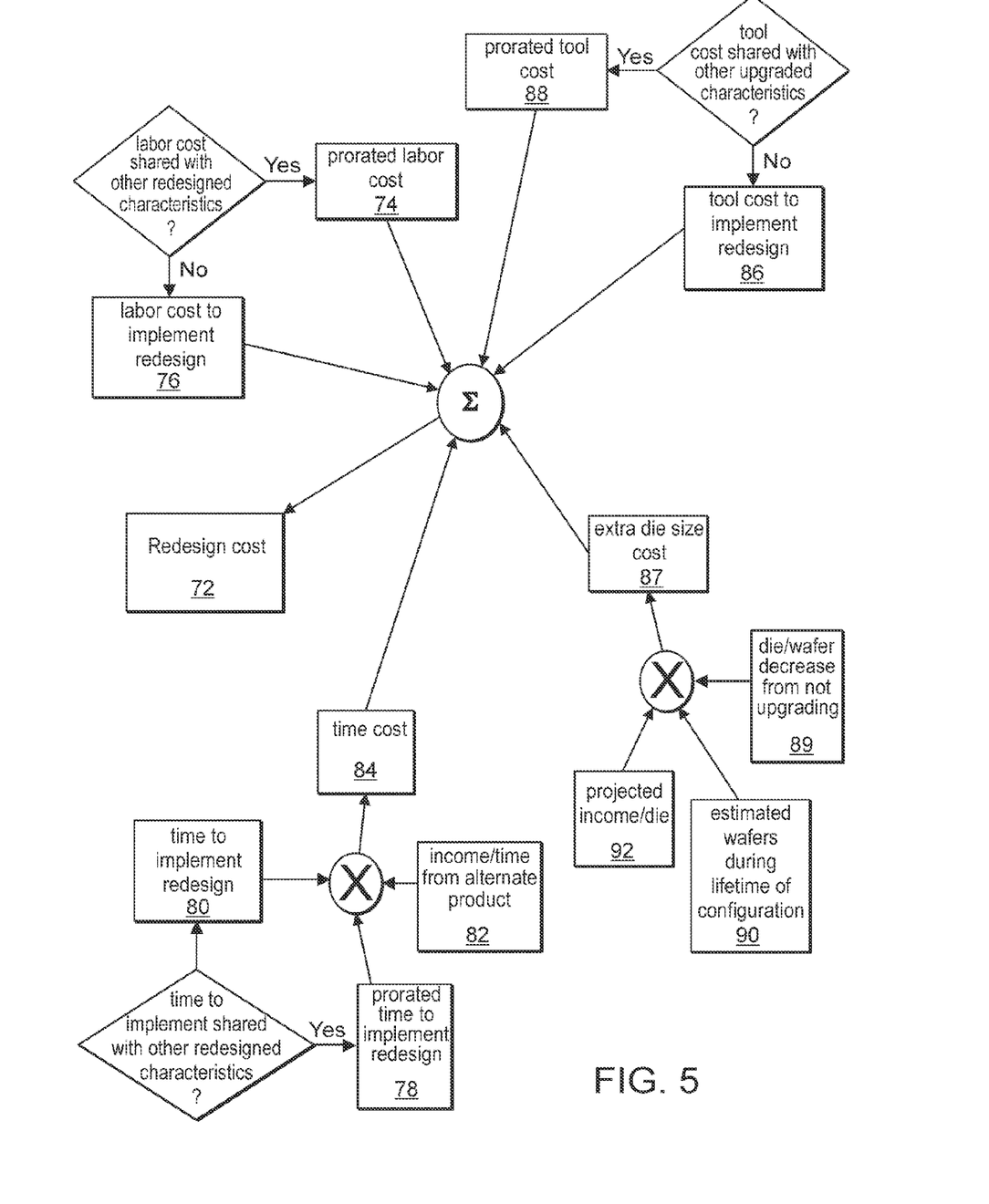
FIG. 5 illustrates an exemplary procedure for establishing a redesign cost for a design rule of an integrated circuit.

An exemplary procedure for establishing a redesign cost for a design rule associated with an integrated circuit is shown in FIG. 5. In the embodiment of FIG. 5, redesign cost 72 includes a labor cost component and a time cost component similar to those in upgrade cost 38 of FIG. 4. Either prorated labor cost 74 or total labor cost 76 to redesign a layout to accommodate a non-scaled design rule is included in redesign cost 72, depending on whether the labor cost for the redesign is properly shared among other design rules which are also not scaled in the layout. Similarly, either prorated time 78 or total time 80 to implement the redesign is multiplied by income per time 82 in arriving at redesign time cost 84. Times such as 78 and 80 may be expressed in terms of man-hours or man-weeks. Income per time 82 represents the income which could be realized by an alternate use of the resources used for the redesign. This could, for example, be income lost by delaying introduction of a future product because the redesign of FIG. 5 slows the design process of the future product. Tool cost 86 (or prorated tool cost 88) are similar to equipment costs 46 and 48 of FIG. 4, with "tool" in the embodiment of FIG. 5 referring to a software application program used for computer-based design and testing. In some cases, redesign of a layout to accommodate non-scaling of a design rule could require an improved design or testing tool.

In the embodiment of FIG. 5, redesign cost 72 also includes extra die size cost 87. Extra die size cost 87 is a way of accounting for the increase in die size of an integrated circuit (as compared to a fully-scaled circuit) which may result from not scaling one or more design rules. This increased die size reduces the number of die produced per wafer, thereby reducing income from a wafer. In this embodiment, decrease 89 in the number of die per wafer is multiplied by the estimated number of wafers 90 to be produced during the life of the new configuration, and by the projected income per die 92 to determine extra die size cost 87. Although not shown in FIG. 5, the extra die size cost attributable to a non-scaled design rule may in some cases be smaller when other design rules are also unscaled. In other words, the die size increase incurred by leaving two design rules unscaled may be smaller than the sum of the die size increases incurred by leaving each of the design rules unscaled individually. In such an embodiment, a proration similar to that shown for the tool cost, labor cost and time cost could be employed. In some embodiments of the method described herein, the effect of unscaled design rules on die size may be accounted for elsewhere than in redesign cost 72. For example, this effect may instead be included in the benefit determined for each configuration, as discussed further below in the description of FIG. 6. With the exception of the inclusion of extra die size cost 87, the procedure of FIG. 5 could also apply to redesign costs associated with characteristics of other products.

Figure 6:
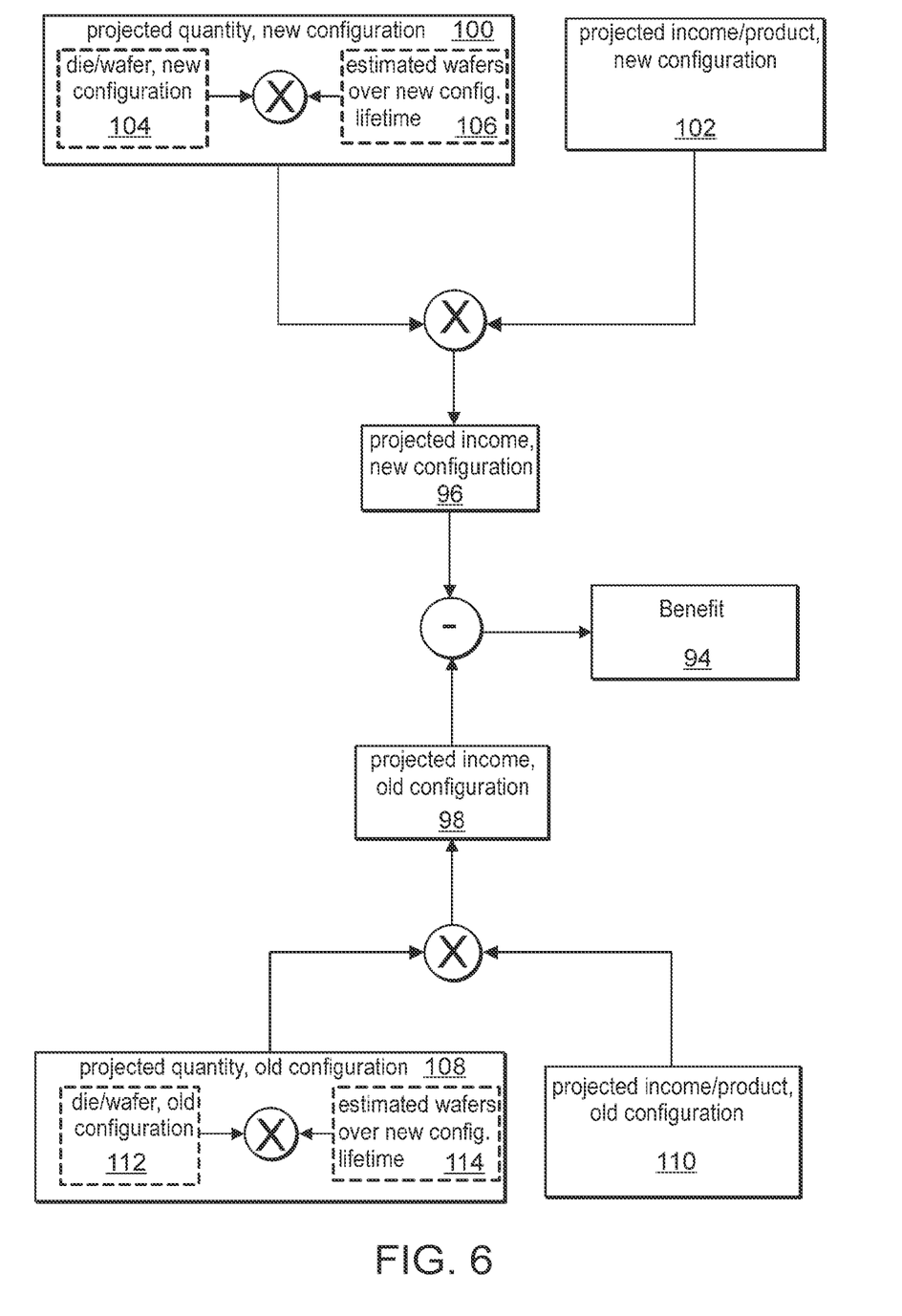
FIG. 6 illustrates an exemplary procedure for determining the benefit associated with a configuration of a product.

An embodiment of a procedure for determining the benefit associated with a configuration of a product is shown in FIG. 6. Benefit 94 is determined in this embodiment by subtracting a projected income 98 for continued fabrication of the old configuration of the product from a projected income 96 for production of the new configuration. In general, new configuration income 96 may be determined by multiplying a projected quantity 100 of the new product by a projected income per product 102 for the new product. In an integrated circuit manufacturing embodiment, the projected quantity 100 may be determined by a product of the projected die per wafer 104 of the new configuration and the projected number of wafers 106 produced during the lifetime of the new configuration. In such an embodiment, income per product 102 represents projected income per die of the new configuration. Similarly, old configuration income 98 may be determined by multiplying a projected quantity 108 of the old product (the quantity which could be produced during the same time period used for determining new configuration income 96) by a projected income per product 110 for the old product. In an integrated circuit manufacturing embodiment, projected quantity 108 may be determined by multiplying die per wafer 112 of the old configuration by the projected number of wafers 114 produced during the lifetime of the new configuration, while income per product 110 is the projected income per die of the old configuration.

The benefit formulation of FIG. 6 may allow various considerations in determining a benefit. For example, market forces and/or suitability for new applications may be included in projected income 102 per new-configuration product and projected income 110 per old-configuration product. If competitors are introducing an upgraded product, the income 110 per old-configuration product may decrease in comparison to the income 102 per new-configuration product. Similarly, competitive pressures (e.g., due to better parameters associated with a new configuration) may cause a reduction in the demand for an old configuration, such that quantity 108 of the old configuration may be limited by the number which can be sold to be lower than quantity 100 of the new configuration. In embodiments of FIG. 6 for integrated circuit manufacturing, the effect of the configuration on the die size may be accounted for using die per wafer 104. Configurations for which more design rules are scaled, for example, will generally have a smaller die size and larger number of die per wafer than configurations for which fewer rules are scaled. In such an embodiment, costs associated with the die size should not also be included in, e.g., the redesign cost of FIG. 5. If an extra die size cost such as cost 87 of FIG. 5 is included in the redesign cost, the benefit would need to be determined in every case using the die per wafer predicted for a completely upgraded configuration (all design rules scaled). The upgrade cost, redesign cost and benefit illustrated by FIGS. 4–6 are all determined with reference to the cost of a previously (or currently, at the time a decision is being made) manufactured configuration of the product. Although this is believed to provide a convenient reference for decisions involving making a change from a current configuration to an upgraded configuration, the costs and benefit could also be determined on an absolute basis or with respect to a different reference, as long as all costs and benefits are found with respect to the same reference.

Figure 7:
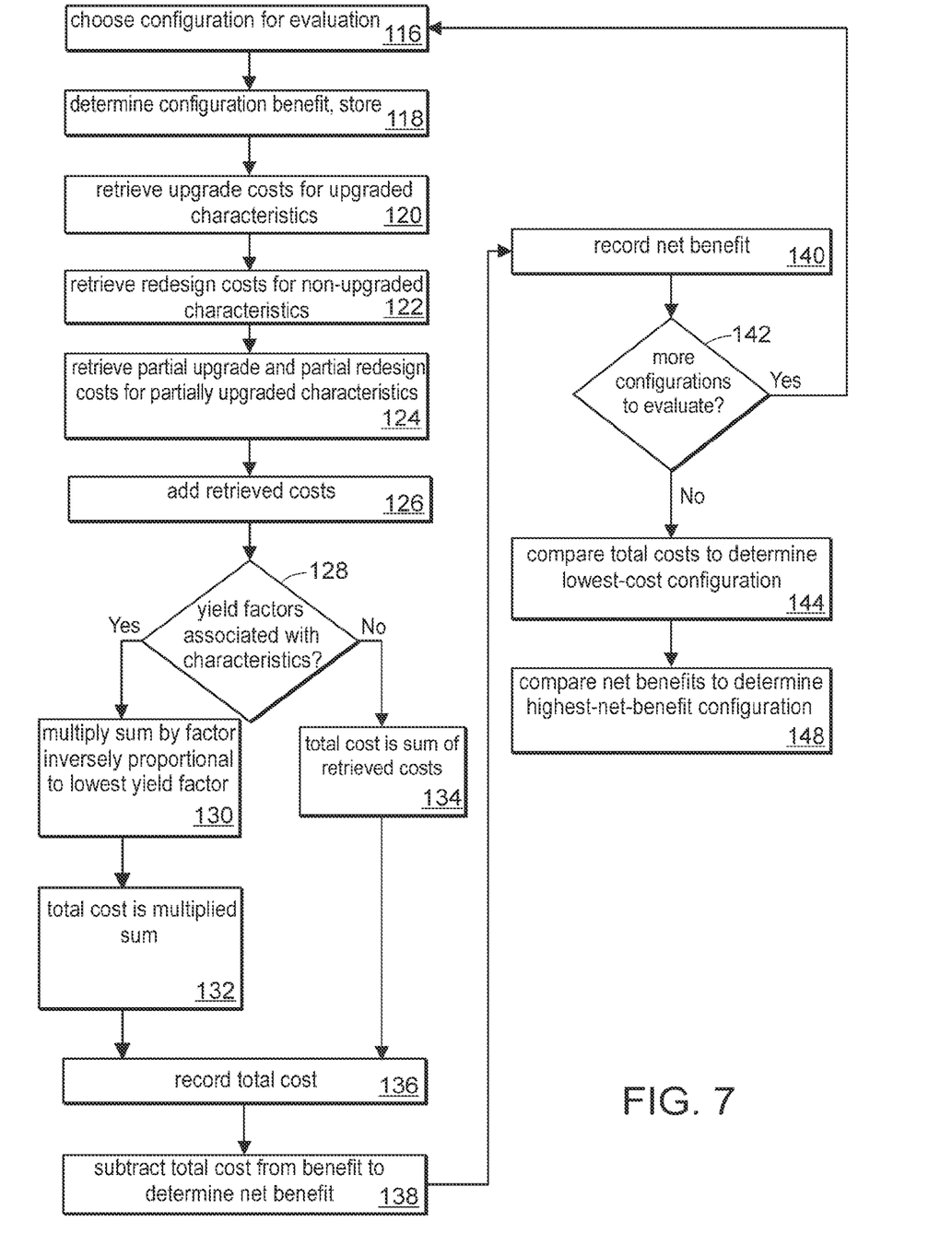
FIG. 7 is a flow diagram illustrating an exemplary embodiment of a method of evaluating costs and/or benefits of possible product configurations.

Turning now to FIG. 7, a flow diagram is shown illustrating an embodiment of a method for evaluating costs and benefits of possible configurations of a manufactured product. A method such as that of FIG. 7 may be performed in various ways, such as by a processor executing program instructions, by a person interacting with a computer program such as a spreadsheet program, or manually. In the embodiment of FIG. 7, a configuration is chosen for evaluation (box 116). In embodiments for which the method is carried out by a computer program, the choice of configuration could be made by user entry or user selection from a group of choices, or by sequential reading from a list of choices. A configuration includes a set of characteristics and a status (upgraded, not upgraded, etc.) of each characteristic, and configuration data similar to that of FIG. 2 may be stored in a data structure such as those discussed with reference to FIG. 2. A benefit for the configuration may then be determined (box 118), using a procedure such as that of FIG. 6. Upgrade costs are then retrieved for any upgraded characteristics in the configuration (box 120), redesign costs are retrieved for the non-upgraded characteristics (box 122), and both partial upgrade and partial redesign costs are retrieved for any partially-upgraded characteristics (box 124). Retrieval of these costs may involve reading of the appropriate values from a data structure such as those discussed with reference to FIG. 1. In some embodiments, the retrieval may also include computing of the appropriate cost, which may be done using methods similar to those of FIGS. 4 and 5. The retrieved costs for the configuration are then added together (box 126).

In some embodiments of the method of FIG. 7, the retrieved upgrade costs, redesign costs, and partial upgrade and redesign costs may all be calculated to achieve the same probability of success of manufacturing the configuration. For a characteristic which is relatively difficult to upgrade, for example, a higher upgrade cost may be established to allow for additional resources such as time and equipment which may be needed to give the same probability of success as for the upgrade of a different characteristic. In this way, costs and/or benefits for different configurations may be compared under the assumption that the configurations have the same likelihood of manufacturing success. An alternative approach to accounting for the likelihood of manufacturing success is to establish a "yield factor" for the upgrade and/or redesign of each characteristic within a configuration, where the yield factor represents a probability that the characteristic can be successfully upgraded or redesigned for (for example, a percentage of products in which the characteristic will be manufactured to a predetermined standard). This yield factor is not necessarily the same as the "yield" of an integrated circuit fabrication process, which typically corresponds to an assumed defect density resulting from the process, though in some cases that yield may be used.

In the embodiment of FIG. 7, if yield factors are associated with the characteristics ("yes" branch of decision box 128), the sum of the retrieved costs is multiplied by a factor inversely proportional to the lowest of the yield factors (box 130), since the yield factor as used herein is preferably less than one. This multiplied sum then represents the total cost of the configuration (box 132). If no yield factors are associated with the characteristics, the sum of the retrieved costs is designated the total cost of the configuration (box 134). In this way, a cost "penalty" is assigned to configurations having a lower probability of manufacturing success (or the cost per product is adjusted to account for a potential smaller amount of product). A factor inversely proportional to the lowest yield factor among the configurations is used as the multiplier in the embodiment of FIG. 7 because the lowest-yield characteristic is assumed in this embodiment to dominate the yield of the manufactured product. The total cost for the configuration is then recorded (box 136), and subtracted from the benefit of the configuration to determine a net benefit for the configuration (box 138). The net benefit is also recorded (box 140). If there are more configurations to be evaluated (decision box 142), the above procedure is repeated for the next configuration. When all desired configurations have been evaluated, the total cost of each configuration may be compared to determine which configuration has the lowest cost (box 144). The net benefits of the configurations may also be compared, to determine the highest-net-benefit configuration (box 146).

Figure 8:
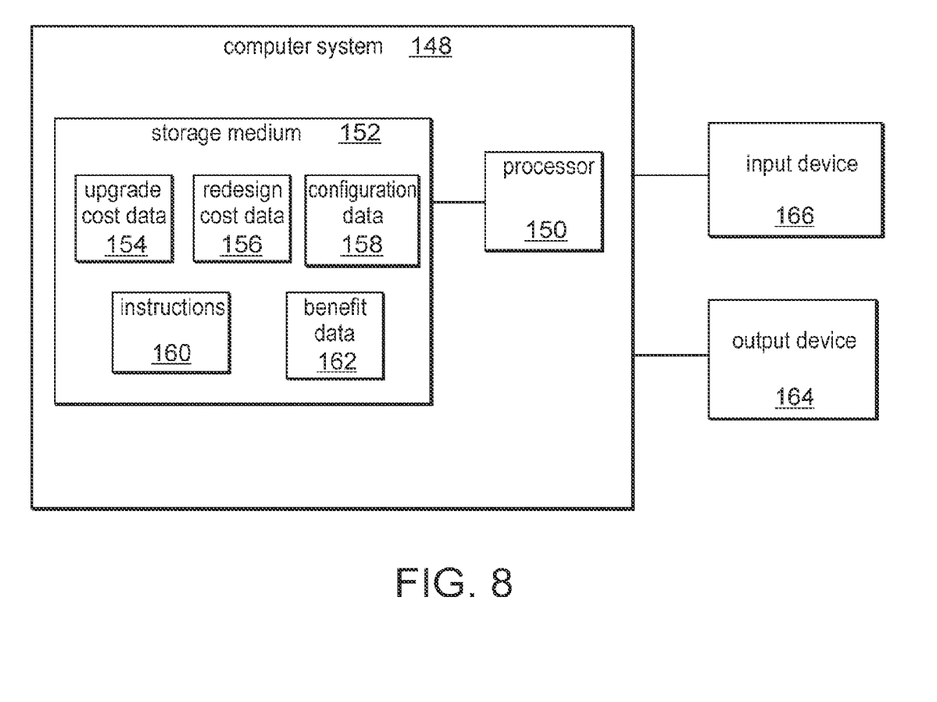
FIG. 8 is a block diagram illustrating an embodiment of a computer-based system which may be used to implement the method described herein.

A block diagram illustrating an exemplary embodiment of a computer-based system which may be used to implement the methods described herein is shown in FIG. 8. Computer system 148 may be a computer or other computational device similarly configured with a processor and storage medium, such as a personal digital assistant or some telephones. Computer system 148 includes processor 150 and storage medium 152 which are operably coupled together (e.g., the processor can access the storage medium when the system is operational). Storage medium 152 may take many forms, such a volatile or nonvolatile memory, a magnetic disk such as a hard drive or floppy drive, an optical disk, and/or a magnetic tape. In some embodiments, storage medium 152 may include a combination of more than one storage device. In the embodiment of FIG. 8, storage medium 152 includes upgrade cost data 154, redesign cost data 156, configuration data 158, benefit data 162, and instructions 160. Upgrade cost data 154 and redesign cost data 156 include information similar to that shown in FIG. 1, while configuration data 158 includes characteristics associated with a configuration and status of the characteristics, similar to the configuration data of FIG. 2. Benefit data 162 may include a benefit value established for a configuration, or multiple benefit values corresponding to multiple configurations. As in the case of the data of FIGS. 1 and 2 discussed above, the data of FIG. 8 may be stored in one or multiple data structures which may take various forms. Instructions 160 may include instructions executable to implement the methods described herein for evaluating configurations of a manufactured product. Computer system 148 may also contain or be coupled to an output device 164, such as a display screen or printer, and an input device 166, such as a keyboard or pointing device.

In FIG. 8 and any other block diagrams appearing herein, the blocks are intended to represent functionality rather than specific structure. Implementation of the represented system using circuitry and/or software could involve combination of multiple blocks into a single circuit, device, data structure or program, or combination of multiple circuits, devices, data structures or programs to realize the function of a single block. For example, storage medium 152 may include memory associated with other elements, such as processor 150. All or part of storage medium 152 may also be external to the case of computer system 148, particularly in embodiments for which storage medium 152 includes a disk or tape. Furthermore, computer system 148 may include other components not explicitly shown, such as additional input/output devices and interfaces. For example, partial upgrade data and partial redesign data as shown in FIG. 1(c) could also be included on storage medium 152, either within upgrade cost data 154 and redesign cost data 156, or separately.

Instructions such as instructions 160 and/or data such as data 154, 156, 158 and 162 of FIG. 8 may be stored on or transmitted over a medium. The medium may be a storage medium such as storage medium 152 in FIG. 8, or a transmission medium such as a wire, cable, wireless transmission link, or a signal traveling along such a wire, cable or link. Depending on the scope of the method to be implemented, various combinations of instructions and data may be stored or transmitted. For example, a method including establishment of upgrade costs and redesign costs using procedures similar to those shown in FIGS. 4 and 5 may be implemented by a set of instructions stored on a storage medium, and the resulting upgrade cost data and redesign cost data may be stored on the same storage medium.

It will be appreciated to those skilled in the art having the benefit of this disclosure that this invention is believed to provide a method and system for evaluating costs and/or benefits of possible configurations of a manufactured product. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A method of evaluating possible configurations of a manufactured product, wherein each configuration is associated with a set of characteristics of the product, said method comprising:
    establishing for each of the characteristics in the set:
        an upgrade cost applicable on condition that the characteristic is upgraded in a manner commensurate with other characteristics in the set; and
        a redesign cost applicable on condition that the characteristic is not upgraded in a manner commensurate with other characteristics in the set; and
    selecting, based on the upgrade costs and the redesign costs, one of the possible configurations by which to alter the manufactured product.

2. The method as recited in claim 1, wherein:
    said evaluating possible configurations of the product comprises evaluating possible layouts of an integrated circuit;
    each characteristic comprises a design rule used in establishing a layout;
    said upgrading in a manner commensurate comprises scaling in size by a common scaling factor; and
    the redesign cost comprises a cost to redesign the layout to accommodate non-commensurate scaling of the corresponding design rule.

3. The method as recited in claim 2, wherein said establishing the upgrade cost for each design rule comprises:
    including an equipment cost associated with new equipment needed to scale the corresponding design rule;
    including a time cost associated with time needed to implement scaling of the corresponding design rule; and
    including an operational cost associated with increased manufacturing operational costs of scaling the corresponding design rule.

4. The method as recited in claim 2, wherein said establishing the redesign cost for each design rule comprises:
    including a labor cost for redesign of the layout to accommodate non-commensurate scaling of the design rule;
    including a time cost associated with time needed to implement the redesign of the layout; and
    including a die size cost associated with a reduction in circuits per wafer caused by the non-commensurate scaling of the design rule.

5. The method as recited in claim 1, wherein
    said evaluating possible configurations of the product comprises evaluating configurations of an electronic system;
    each characteristic comprises a circuit within the electronic system;
    said upgrading in a manner commensurate comprises scaling in operating speed by a common factor; and
    the redesign cost comprises a cost to redesign operating software for the system to accommodate non-commensurate scaling of the corresponding circuit.

6. The method as recited in claim 5, wherein said evaluating configurations of the electronic system comprises evaluating configurations of a computer system.

7. The method as recited in claim 5, wherein said evaluating configurations of the electronic system comprises evaluating configurations of an electronic system implemented in an integrated circuit.

8. The method as recited in claim 1, wherein said establishing the upgrade cost for each characteristic in a given configuration comprises establishing an upgrade cost dependent upon which of the other characteristics are upgraded in the given configuration.

9. The method as recited in claim 1, wherein said establishing for each of the characteristics an upgrade cost comprises establishing a cost to achieve a predetermined likelihood of successful upgrade of the characteristic, wherein the predetermined likelihood is the same for each characteristic.

10. The method as recited in claim 1, further comprising computing for each evaluated configuration a predicted total cost of the configuration, wherein the total cost includes a sum over all of the characteristics of either the upgrade cost or the redesign cost for the characteristic, depending upon whether the configuration includes upgrading of the characteristic.

11. The method as recited in claim 10, wherein:
said establishing for each of the characteristics an upgrade cost and a redesign cost further comprises establishing for at least one of the characteristics a partial upgrade cost and a partial redesign cost, wherein the partial upgrade cost and partial redesign cost are applicable on condition that the characteristic is upgraded in a manner incommensurate with others of the characteristics; and
said computing for each of the configurations a predicted total cost further comprises computing a total cost including a sum over all of the characteristics of either the upgrade cost, the redesign cost, or a sum of the partial upgrade cost and partial redesign cost, depending upon whether the configuration includes upgrading, not upgrading, or partially upgrading the characteristic.

12. The method as recited in claim 10, further comprising establishing a yield factor for each characteristic which is upgraded in a given configuration, wherein the yield factor is proportional to a predicted percentage of products including the upgraded characteristic which are manufactured successfully, and wherein said computing for each of the possible configurations a total cost further comprises multiplying the sum by a factor inversely proportional to the smallest of the yield factors established for the characteristics within the configuration.

13. The method as recited in claim 10, further comprising computing for each evaluated configuration a predicted benefit of the configuration, wherein the benefit includes a predicted increase in income associated with manufacture of the configuration.

14. The method as recited in claim 13, wherein said computing for each evaluated configuration the predicted benefit comprises including an increase in income as compared to income from a previously-manufactured configuration.

15. The method as recited in claim 13, further comprising subtracting the total cost from the benefit for each configuration to determine a net benefit for each configuration.

16. The method as recited in claim 10, further comprising comparing the total costs of the evaluated configurations to determine a lowest-cost configuration.

17. The method as recited in claim 15, further comprising comparing the net benefits of the evaluated configurations to determine a highest-net-benefit configuration.

18. A computer-based system for evaluating possible configurations of a manufactured product, wherein each configuration is associated with a set of characteristics of the product, said system comprising:
a processor; and
a storage medium operably coupled to the processor, wherein the storage medium includes:
upgrade cost data and redesign cost data for each of the characteristics within the set; and
program instructions executable by the processor for:
computing a total cost for each of the possible configurations using the upgrade cost data and redesign cost data;
comparing the total costs of a plurality of the possible configurations; and
determining, from the step of comparing, a lowest-cost configuration of the plurality of possible configurations by which to alter the manufactured product.

19. The system as recited in claim 18, further comprising an input device adapted for selection of a configuration to be evaluated.

20. The system as recited in claim 18, wherein the storage medium further includes configuration data indicating which characteristics are upgraded in each configuration.

21. The system as recited in claim 18, wherein the storage medium further includes benefit data characterizing an increase in income associated with manufacture of the product.

22. The medium as recited in claim 18, wherein the program instructions are further for
subtracting the computed total costs from benefit incomes established for each of the possible configurations to determine net benefit incomes for each of the possible configurations; and
comparing the net benefit incomes of each of the possible configurations to determine a highest-net-benefit-income configuration of the possible configurations by which to alter the manufactured product.

23. A computer-usable medium, comprising:
first instructions executable on a computational device for establishing an upgrade cost for each of a set of characteristics of a product, wherein the upgrade cost is applicable on condition that the characteristic is upgraded in a manner commensurate with other characteristics associated with a possible configuration of the product;
second instructions executable on the computational device for establishing a redesign cost for each of the set of characteristics, wherein the redesign cost is applicable on condition that the characteristic is not upgraded in a manner commensurate with other characteristics associated with a possible configuration of the product;
third instructions executable on the computational device for computing a total cost for the product using the upgrade costs and redesign costs; and
fourth instructions executable on the computational device for determining a net benefit income for the product by subtracting the computed total cost from a benefit income established for the product.

24. The medium as recited in claim 23, wherein the product comprises an integrated circuit, a configuration comprises a layout of the integrated circuit, a characteristic comprises a design rule used in establishing the layout, said upgrading in a manner commensurate comprises scaling in size by a common scaling factor, and the redesign cost comprises a cost to redesign the layout to accommodate non-commensurate scaling of the corresponding design rule.

25. The medium as recited in claim 23, wherein the product comprises an electronic system, a characteristic comprises a circuit within the electronic system, said upgrading in a manner commensurate comprises scaling in operating speed by a common factor, and the redesign cost comprises a cost to redesign operating software for the system to accommodate non-commensurate scaling of the corresponding circuit.

26. The medium as recited in claim 23, further comprising upgrade cost data including the upgrade costs for each of the set of characteristics, and redesign cost data including the redesign costs for each of the set of characteristics.

27. The medium as recited in claim 26, wherein the upgrade cost for a characteristic depends upon which other characteristics are upgraded in a given configuration.

28. The medium as recited in claim 23, wherein the first and second instructions are further executable on a computational device for establishing an upgrade cost or a redesign for each of a set of characteristics of a plurality of different configurations for the product, wherein the third instructions are further executable on a computational device for computing a total cost for each of the different configurations for the product, and wherein the medium further comprises fifth instructions executable on the computational device for comparing the total costs of the plurality of different configurations for the product to determine a lowest-cost configuration of the plurality of different configurations.

29. The medium as recited in claim 23, further comprising sixth instructions executable on the computational device for comparing net benefit incomes of a plurality of different configurations for the product to determine a highest-net-benefit-income configuration of the plurality of different configurations.

* * * * *